United States Patent [19]

Gladieux

[11] Patent Number: 6,059,096

[45] Date of Patent: May 9, 2000

[54] GUIDE SYSTEM FOR PACKAGES ON A CURVED CONVEYOR

[75] Inventor: Michael J. Gladieux, Perrysburg, Ohio

[73] Assignee: Dillin Engineered Systems Corporation, Perrysburg, Ohio

[21] Appl. No.: 08/881,914

[22] Filed: Jun. 25, 1997

[51] Int. Cl.[7] .................................................. B65G 21/20
[52] U.S. Cl. ........................................................ 198/836.3
[58] Field of Search ........................... 198/836.3; 406/86, 406/88

[56] References Cited

U.S. PATENT DOCUMENTS

| | | |
|---|---|---|
| 1,857,566 | 5/1932 | Perry . |
| 1,877,334 | 9/1932 | Lathrop et al. ........................ 198/836.3 |
| 1,929,707 | 10/1933 | Majonnier .............................. 198/836.3 |
| 2,156,020 | 4/1939 | Lathrop . |
| 2,229,605 | 1/1941 | Snyder et al. . |
| 2,837,203 | 6/1958 | Reeser . |
| 3,527,336 | 9/1970 | Johnston . |
| 4,029,197 | 6/1977 | Clarke et al. . |
| 4,642,975 | 2/1987 | Langen et al. ........................ 198/836.3 |
| 5,099,979 | 3/1992 | Kehrel . |
| 5,161,678 | 11/1992 | Garvey . |
| 5,186,333 | 2/1993 | Pierson et al. . |
| 5,211,280 | 5/1993 | Houde .................................. 198/836.3 |
| 5,291,988 | 3/1994 | Leonard ................................ 198/836.3 |
| 5,551,555 | 9/1996 | Gladieux . |

FOREIGN PATENT DOCUMENTS 1452247   10/1976   United Kingdom .

*Primary Examiner*—Joseph E. Valenza
*Attorney, Agent, or Firm*—MacMillan, Sobanski & Todd, LLC

[57] ABSTRACT

A guide system for packages on a conveyor system having one or more curved sections is described. The guide system includes an adjustable guide member having a shape corresponding to the shape of the conveyor system for aligning and guiding the packages on the conveyor system. The guide system also includes a plurality of generally linear, control members for adjusting the position of the guide member so as to accommodate different sizes of packages. In the curved section of the conveyor system, the control members are spaced apart in an end to end fashion and extend at an angle α relative to one another. A coupling device is used to operatively connect a first control member to a second control member such that rotation of the first member will cause the second member to rotate. In one embodiment, the coupling device is a partial revolution universal joint. The partial revolution universal joint includes a directionally sensitive, flexible arm assembly and a tie rod assembly. The directionally sensitive, flexible arm assembly is secured to the ends of two adjacent control members. The tie rod assembly is secured to the faces of the ends of the two adjacent control members. Together, these two structures function to transfer the rotational motion of a first control member to a second control member. In addition, the partial revolution universal joint accommodates the change in relative angle between any two opposing points fixed on the outer surface of the first and second control members as these control members are rotated.

16 Claims, 10 Drawing Sheets

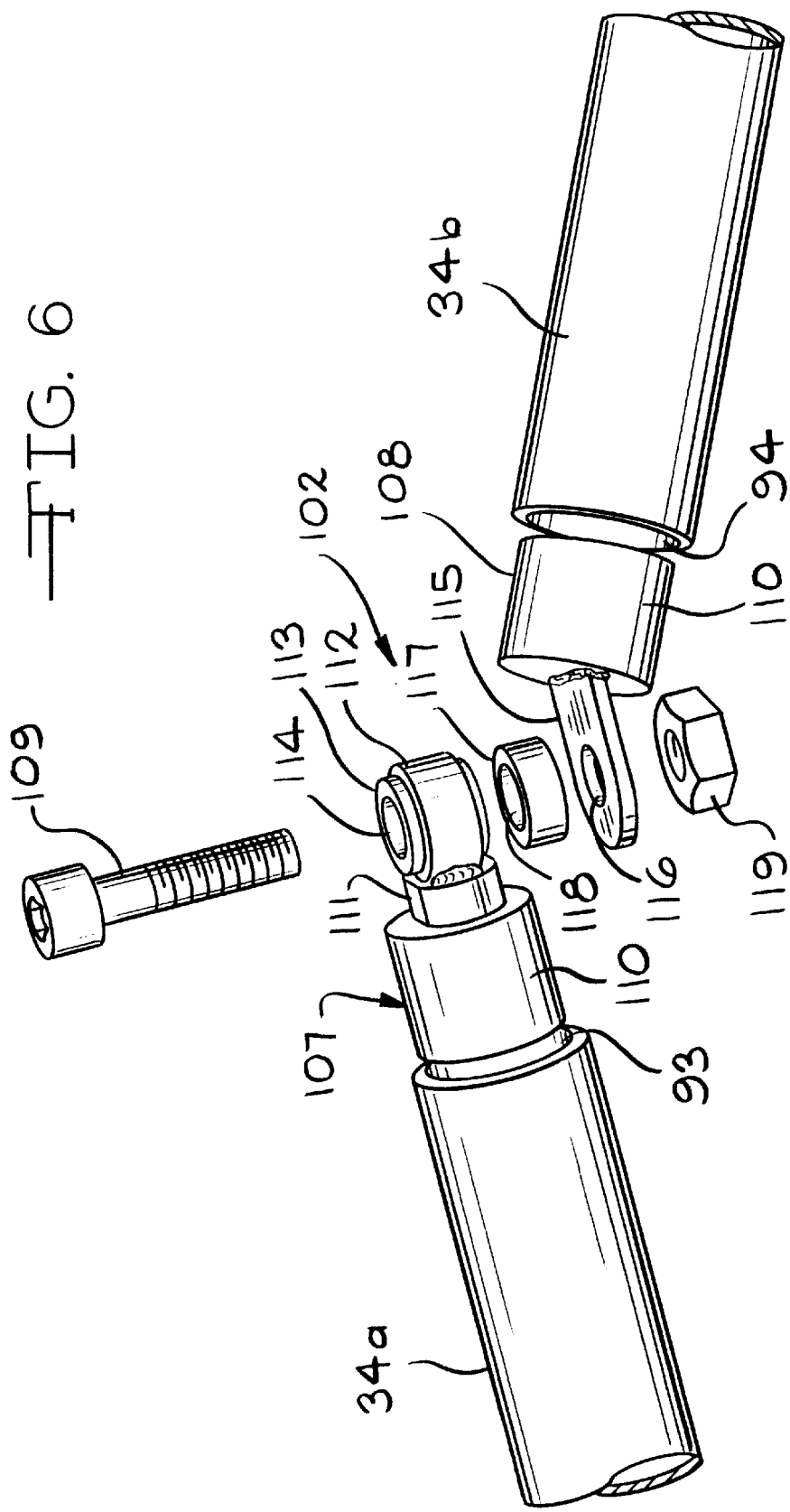

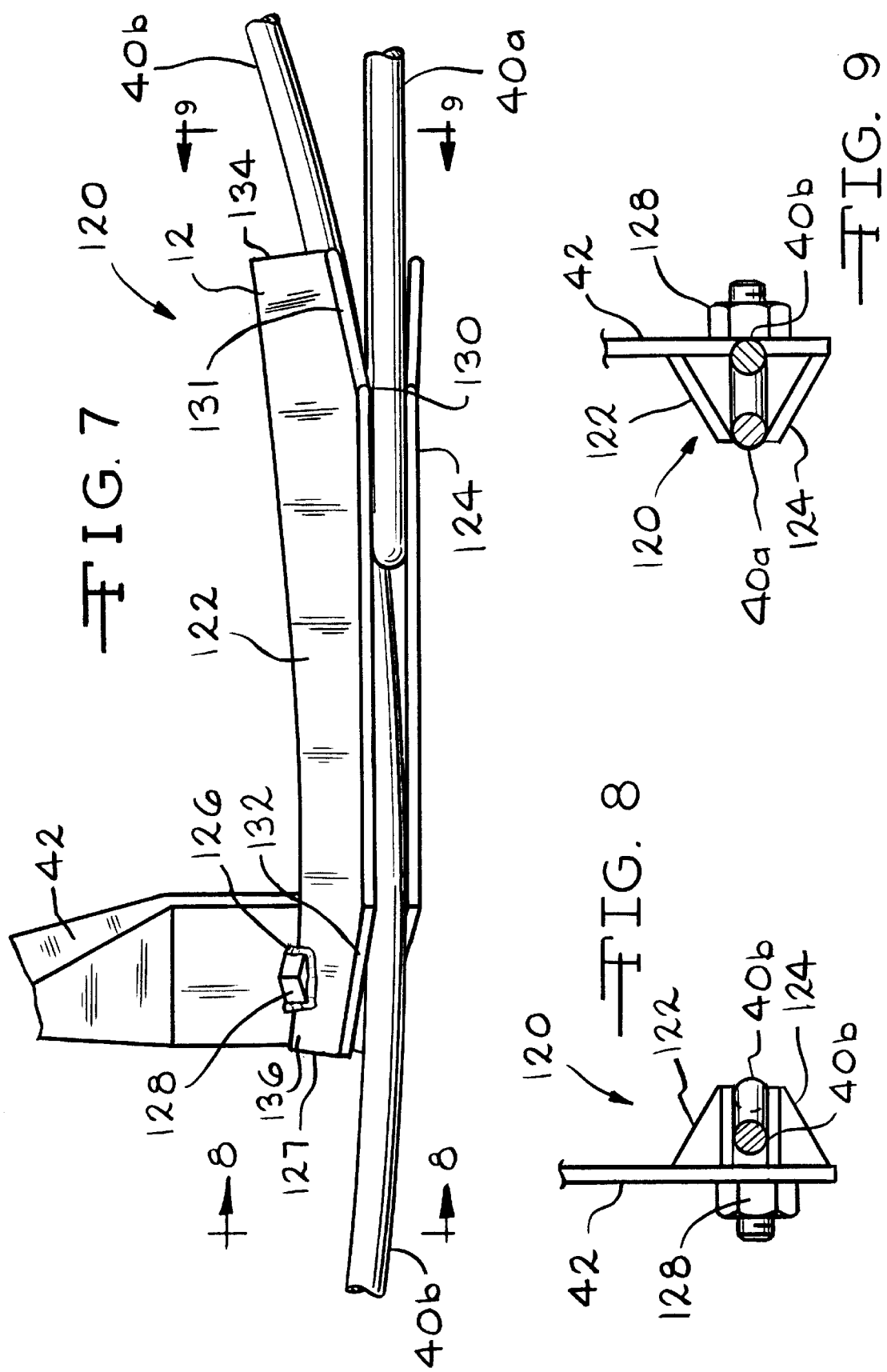

GUIDE SYSTEM FOR PACKAGES ON A CURVED CONVEYOR

BACKGROUND OF THE INVENTION

This invention relates in general to conveyor systems which include a guide system for packages moved on the conveyor system. In particular, this invention relates to a guide system for use on curved conveyor systems.

A conveyor system for packages is a means for moving packages from one location to another. For example, the packages may be moved during a manufacturing operation, for assembly into a larger container, for storage in a warehouse, or for shipment. Two conventional types of conveyor systems are air lift conveyors and belt conveyors. An air lift conveyor moves the packages on an air stream by use of directional jets. A belt conveyor moves the packages on an endless belt.

The conveyor system may include a guide system for aligning the packages as they move along the conveyor. The guide system keeps the packages on the conveyor and keeps them straight so that they can be moved rapidly and efficiently. One type of conventional guide system includes guide rails positioned along the length of the conveyor. A belt conveyor usually includes two such guide rails positioned along the two sides of the endless belt. An air lift conveyor usually includes a third guide rail positioned along the upper surface of the packages.

Often a single conveyor system is used to move several different sized packages. When the packages are changed, the guide rails must be adjusted to accommodate the different sizes. In the past, the guide rails have usually been positioned on the conveyor system by mounting brackets positioned along the length of the guide rails. Adjustment of the guide rails required individual adjustment of each of the mounting brackets. This usually involved manually loosening a fastener, moving the mounting bracket to its new position, and then tightening the fastener. Such individual adjustment of each of the mounting brackets required large amounts of time and labor. Significant production capacity was lost during the time required to make the changeover to a new package size.

Guide systems have been developed which eliminate the need to individually adjust the mounting brackets. In one type of guide system, a linear control tube is connected to a linear guide rail through several rigid arms. The control tube can be rotated about its longitudinal axis which causes the guide rail to be repositioned. The guide rails can be moved through a range of positions so as to accommodate different sizes of packages. Very long linear sections of the control tube can be rotated by a single lever, thereby allowing the guide rail to be more easily and rapidly adjusted. This type of guide system works well for conveyor systems having all straight sections. However, it is often necessary that the conveyor system include curved sections so as to accommodate equipment and building constraints. Accordingly, it would be desirable to provide a rapidly adjustable guide system for use with a curved conveyor.

SUMMARY OF THE INVENTION

This invention relates to an adjustable guide system used with a conveyor system having one or more curved sections. The guide system includes at least one adjustable guide member which aligns the packages as they move along the conveyor system. The guide member can be repositioned to accommodate packages of varying size. The location of the guide member can be adjusted using a plurality of generally linear, tubular control members. Each control member is operatively connected to the guide member and to each other. Because all of the control members are operatively connected to each other, the guide member can be adjusted by simply rotating a single control member.

In a straight section of a conveyor system, the control members extend above the conveyor surface in a spaced apart and end-to-end fashion and, therefore, are co-linear. However, above a curved section of a conveyor system, the control members are also spaced apart in an end-to-end fashion but are not co-linear. More specifically, the control members extend at an angle, $\alpha$, relative to one another. Because the guide member is repositioned by rotating the control members, a coupling device is needed between control members, which are not co-linear when used above a curved section, for accommodating the angle between the control members. Accordingly, this invention is directed to such a coupling device.

A first embodiment of a coupling device in accordance with this invention is a partial revolution universal joint. The partial revolution universal joint includes a flexible arm assembly and a tie rod assembly. The flexible arm assembly includes a pair of spaced apart arms which are connected at one end and have a pair of free ends at the other end. The pair of arms are spaced apart at an angle $\beta$ relative to one another. Each free end of the pair of arms is secured to a collar. A first collar is secured to the end of a first control member while a second collar is secured to the adjacent end of a second control member. The flexible arm assembly is used for transferring the rotational motion of the first control member to the second control member as well as for accommodating the change in angle between any two fixed opposing points on the two control members as the control members are rotated.

The tie rod assembly is also used in transferring the rotational motion of the first control member to the second control member by maintaining the point of intersection of the center lines of the first and second control members. In addition, the tie rod assembly functions to maintain the spacing between the first control member and the second control member. The tie rod assembly includes a first tie rod end adapter connected to the first control member and a second tie rod end adapter connected to the second control member. The first tie rod end adapter may have an eyebolt extending therefrom in a generally parallel direction. The eyebolt includes an aperture formed therein in the eye portion of the eyebolt. The second tie rod end adapter has an extension extending therefrom at an angle $\phi$ relative to the second tie rod adapter. The extension also has an aperture formed therein. The first tie rod end adapter is secured to the second tie rod end adapter with a fastener which is positioned in the eye portion aperture and the extension aperture when these apertures have been aligned with one another. The eyebolt may include a spherical bushing positioned in the eye portion aperture for providing one or more degrees of freedom of movement of the fastener positioned therein.

A second embodiment of a coupling device for use in a guide system for a curved conveyor is any known style universal joint. The universal joint may be used to connect two adjacent control members used in the curved section of the conveyor system.

Depending on the curvature of the conveyor system, it may be necessary to use a plurality of guide member sections. When the guide member used in the curved section of the conveyor system is repositioned, the overall length of the active portion of the guide member will change due to the change in radius of the guide path. Accordingly, this invention is directed to a slip joint guide rail bracket which allows two sections of a guide rail to be used for accommodating this change in length.

Finally, this invention is directed to a backbar assembly which is used to connect the control member brackets (arms) to the guide members.

Various objects and advantages of this invention will become apparent to those skilled in the art from the following detailed description of the preferred embodiment, when read in light of the accompanying drawings.

BRIEF DESCRIPTION OF THE DRAWINGS

FIG. 6 is an exploded top view of a second member which is a part of the coupling device shown in FIG. 4.

FIG. 7 is a front view of a slip joint guide rail bracket in accordance with this invention.

FIG. 8 is a side view of the slip joint guide rail bracket taken at line 8—8 of FIG. 7.

FIG. 9 is a side view of the slip joint guide rail bracket taken at line 9—9 of FIG. 7.

DETAILED DESCRIPTION OF THE PREFERRED EMBODIMENT

Figure 1:
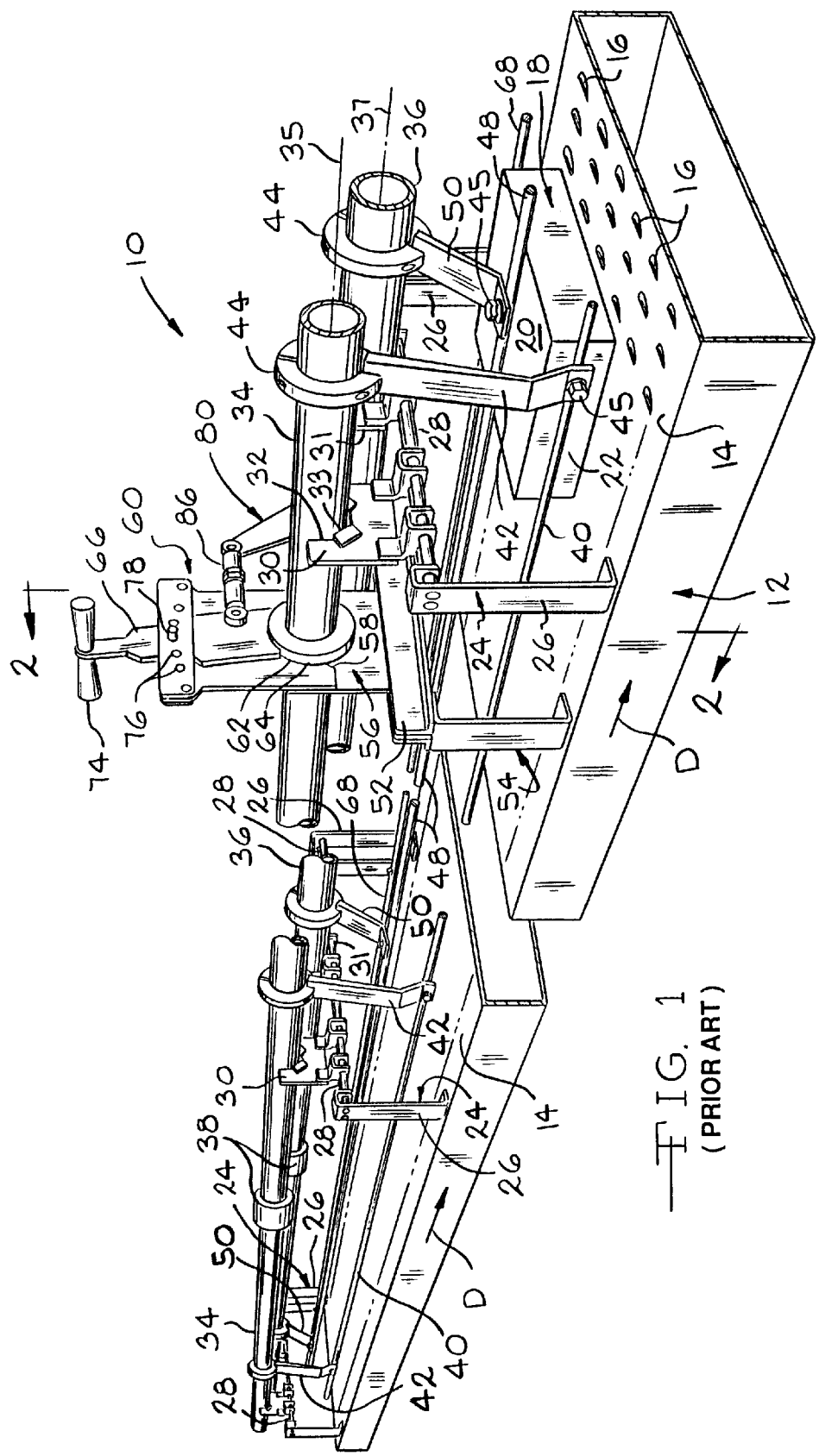
FIG. 1 is a perspective view of a prior art straight conveyor system which includes an adjustable guide system.
Figure 2:
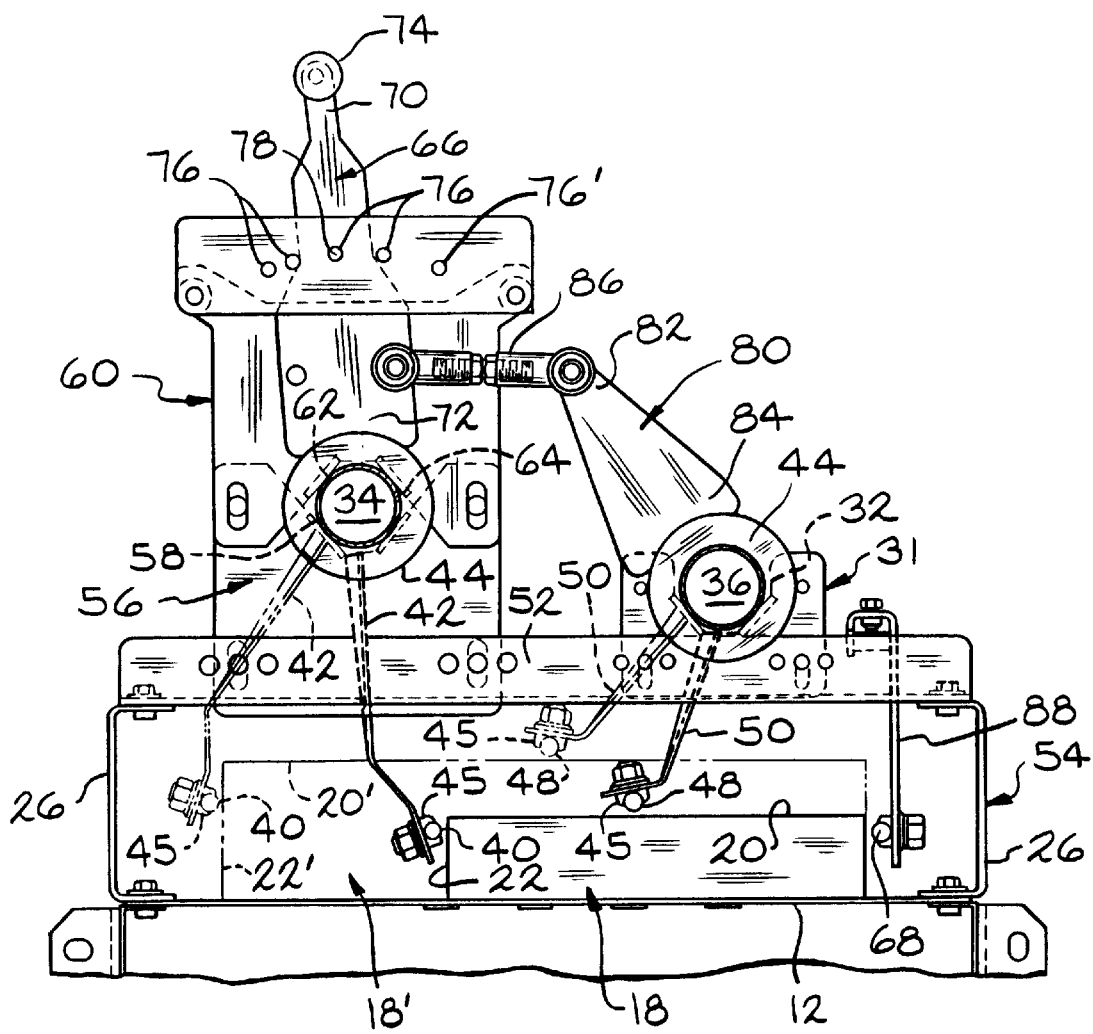
FIG. 2 is a cross-sectional view of the straight conveyor system taken at line 2—2 of FIG. 1.

Referring now to the drawings, there is illustrated in FIGS. 1 and 2, a known conveyor system, indicated generally at 10, having multiple straight sections. The conveyor system 10 shown therein includes an air lift conveyor 12 and a quickset type of guide system which is adjustable to accommodate different sizes of packages. This guide system is fully described in assignee's commonly owned U.S. Pat. No. 5,551,555, which is herein incorporated by reference in its entirety. Portions of this particular type of guide system will be discussed below as an aid in understanding the devices of this invention.

Referring to FIG. 1, the conveyor 12 includes a conveying surface, such as an upper surface 14 which has directional jets 16 formed therein for moving packages on a stream of air. Alternatively, the conveyor system 10 could include a belt conveyor or other type of conveyor. The conveyor system 10 can extend any desired distance, and is typically made up of straight sections which can be up to 100 feet (30.48 meters) long or longer. It is adapted to move packages such as package 18 along a direction D which is generally from left to right in the illustrated view. The package 18 has an upper surface 20 generally parallel to the upper surface 14 of the conveyor 12, and two side surfaces 22 (only one of which is shown) extending generally parallel to the direction D.

In general, the quickset type of guide system shown in FIGS. 1 and 2 is supported above the conveyor 12 by a frame assembly. A plurality of frames 24 are mounted on the upper surface 14 of the conveyor 12 at intervals along its length. The frames 24 extend across the upper surface 14 generally perpendicular to the direction D. Each frame 24 includes a pair of vertically extending side members 26 and a horizontally extending cross member 28 connected therebetween. The cross member 28 can be a rod or other suitable structure. A pair of supports 30 and 31 are positioned on top of each cross member 28. The supports 30, 31 are generally planar and extend upward from the cross member 28. Each support 30, 31 includes a generally semicircular recess 32 formed in its upper surface. Each of the supports 30, 31 is aligned with corresponding supports 30, 31 on the other frames 24 along the length of the conveyor, so that the recesses 32 are aligned.

The quickset type of guide system shown in FIGS. 1 and 2 can be adjusted through the operation of one or more control members. As shown therein, a generally linear first control member, such as first mounting tube 34, is positioned in the recess 32 of the support 30 on each frame 24. Preferably, two pieces of plastic 33 are positioned between the recess 32 and the mounting tube 34 to protect the surface of the mounting tube and to dampen vibration. A generally linear second control member, such as second mounting tube 36, is positioned in the recess 32 of the other support 31 on each frame 24. Again, preferably two pieces of plastic (not shown) are positioned between the recess 32 and the mounting tube 36. Because the first and second mounting tubes 34 and is 36 are positioned in recesses 32 of supports 30 and 31, respectively, each of the first and second mounting tubes can be rotated around its respective longitudinal axis 35 and 37.

The supports 30 and 31 can be positioned at desired intervals along the length of the conveyor system 10 to support the mounting tubes 34 and 36, for example, at 10 foot intervals. Preferably, each of the first and second mounting tubes 34 and 36 is generally shaped as an elongated tube having a generally circular cross section. Each mounting tube 34 and 36 is preferably formed from a metallic material such as stainless steel. The mounting tubes 34 and 36 may be in multiple sections connected together by couplers 38, but they can also be single-piece tubes.

The quickset type of guide system shown in FIGS. 1 and 2 also includes one or more adjustable guide members for contacting and guiding the packages 18 as they move along the conveyor 12. A generally linear, first guide member such as first guide rail 40 is connected to the first mounting tube 34. Preferably, the guide rail 40 is connected to the mounting tube 34 by a plurality of arms such as first mounting brackets 42 extending therebetween. Preferably, the first mounting brackets 42 are positioned along the entire length of the first guide rail 40. Each first mounting bracket 42 is connected to the first mounting tube 34 at a collar 44, although any suitable connection can be used. The mounting bracket 42 can be connected to the first guide rail 40 by any suitable means, such as a barlock 45. Other types of connectors can also be used.

Similarly, a generally linear, second guide member such as second guide rail 48 is connected to the second mounting tube 36 by a plurality of arms such as second mounting brackets 50 extending therebetween. Preferably, the second mounting brackets 50 are positioned along the entire length of the second guide rail 48. Each second mounting bracket 50 is connected to the second mounting tube 36 at a collar 44. The second mounting racket 50 is connected to the second guide rail 48 by a connector such as a barlock 45.

Preferably, the straight conveyor system 10 also includes a fixed guide rail 68 positioned along one side of the conveyor 12. The fixed guide rail 68 cooperates with the adjustable first guide rail 40 and the second guide rail 48 to align each package 18 during its movement on the conveyor 12. The fixed guide rail 68 is connected to a cross member 28 (shown in FIG. 2) by a mounting bracket 88.

The adjustable first guide rail 40, the second guide rail 48, and the fixed guide rail 68 all lie generally parallel to the mounting tubes 34 and 36. Preferably, each guide rail 40, 48 and 68 is generally shaped as an elongated bar having a generally circular cross section. Preferably, each guide rail 40, 48 and 68 is formed from a metallic material such as stainless steel. If the conveyor system 10 is made up of sections, the guide rails 40, 48 and 68 of successive sections should be in alignment. The guide rails 40, 48 and 68 and mounting brackets 42, 50 and 88 are preferably flexible to accommodate any misalignment which may occur between successive sections of guide rails if adjustments to these sections are not simultaneous.

It is important that the first guide rail 40 and the second guide rail 48 resist deflection by the packages 18 after the guide rails 40 and 48 have been adjusted to the desired position. Excessive deflection of the guide rails 40 and 48 could cause misalignment of the packages 18 on the conveyor 12. Therefore, it is preferred that the first mounting tube 34 and the second mounting tube 36 each have sufficient rotational stiffness and flexural rigidity to resist deflection. The rotational stiffness and flexural rigidity can be adjusted by varying the diameter of the mounting tubes 34 and 36 or other design characteristics known, to a competent engineer. The flexural rigidity may be further adjusted by varying the support spacing.

In the quickset type of guide system shown in FIG. 1 and 2, rotation of the first mounting tube 34 causes the connected first guide rail 40 to move in a generally arcuate path so as to adjust the position of the guide rails 40. Similarly, rotation of the second mounting tube 36 causes the connected second guide rail 48 to move in a generally arcuate path. Both the first mounting tube 34 and the second mounting tube 36 can be actuated by a single lever 66, as described below. At one position along the conveyor system 10, a cross member 52 of a frame 54 is reinforced and extends upward a short distance. For purposes of illustration of the invention, the frame 54, frame 24 and mounting brackets 42 and 50 have been shown closer to one another then they would normally be positioned. Normally, these components would be longitudinally spaced apart at a desired distance, for example 8 to 10 feet (2.4 to 3.0 meters). A generally planar support 56 is connected to the cross member 52 and extends upward therefrom. The support 56 includes a generally semicircular recess 58 in its upper surface. An adjuster panel 60 is connected to the top of the support 56. The adjuster panel 60 is generally planar, and it includes a generally semicircular recess 62 in its lower surface. When the adjuster panel 60 is connected to the support 56, the recess 62 of the adjuster panel 60 combines with the recess 58 of the support 56 to form a generally circular aperture 64. The first mounting tube 34 extends through the aperture 64. The aperture 64 is aligned with the recesses 32 of the supports 30.

As will be explained more fully below in relation to FIG. 2, the adjuster panel 60 also includes a plurality of apertures 76 formed therein positioned in an arc. A first lever 66 is mounted for generally arcuate movement within the adjuster panel 60 to cause rotation of the first mounting tube 34. The first lever 66 includes an aperture 79 (not shown). The aperture 79 can be aligned with one of the apertures 76 of the adjuster panel 60. A pin 78 is positioned through the aligned apertures 76 and 79 to fix their respective positions.

Referring now to FIG. 2, the adjuster panel 60, first lever 66 and associated structures are illustrated in more detail. A frame 54 mounted on the conveyor 12 includes a pair of side members 26 and a cross member 52 connected therebetween. The cross member 52 is reinforced and extends upward a short distance. A generally planar support 56 is connected to the cross member 52 and extends upward therefrom. The support 56 includes a generally semicircular recess 58 in its upper surface.

An adjuster panel 60 is positioned on top of the support 56 and connected thereto. The adjuster panel 60 is generally planar, and it includes a generally semicircular recess 62 in its lower surface. Thus, when the adjuster panel 60 is connected to the support 56, the recess 62 of the adjuster panel 60 combines with the recess 58 of the support 56 to form a generally circular aperture 64. The first mounting tube 34 extends through the aperture 64. A collar 44 is positioned around the first mounting tube 34.

A first lever 66 is mounted in the adjuster panel 60 to cause rotation of the first mounting tube 34. The first lever 66 includes an upper end 70 and a lower end 72. A handle 74 is attached to the upper end 70 to facilitate adjustment of the first lever 66. The lower end 72 of the first lever 66 is attached to the collar 44 positioned around the first mounting tube 34. Thus, movement of the first lever 66 causes rotational movement of the first mounting tube 34, and the first lever pivots in an arcuate motion about the first mounting tube.

The adjuster panel 60 includes a plurality of apertures 76 formed therein which are positioned in an arc. The first lever 66 includes an aperture 79 which can be aligned with one of the apertures 76. A pin 78 is positioned through the aligned apertures 76 and 79 when the first lever 66 has been adjusted to fix their respective positions. In this manner, the first lever 66 can be adjusted to preselected positions. Other structures such as a protrusion and notches can also be used instead of the pin 78 and apertures 76 and 79.

A second support 31 is also positioned on top of the cross member 52. The support 31 includes a generally semicircular recess 32 formed in its upper surface. The second mounting tube 36 is positioned in the recess 32. A collar 44 is positioned around the second mounting tube 36.

A second lever 80 includes an upper end 82 and a lower end 84. The upper end 82 of the second lever 80 is connected to the first lever 66 by a linkage 86. The lower end 84 of the second lever 80 is attached to the collar 44 around the second mounting tube 36. Thus, movement of the second lever 80 causes rotational movement of the second mounting tube 36.

In the view of FIG. 2, a first guide rail 40 is shown behind the adjuster panel 60 at two alternate positions. The first guide rail 40 is connected to the first mounting tube 34 by a first mounting bracket 42 extending therebetween. The first mounting bracket 42 is connected to the first mounting tube 34 at a collar (not shown) positioned around the first mounting tube 34. The first mounting bracket 42 is connected to the first guide rail 40 by a barlock 45. Rotation of the first mounting bracket 42 causes the connected first guide rail 40 to move in a generally arcuate path to adjust the guide rail.

A second guide rail 48 is shown behind the support 31 in the view of FIG. 2, at two alternate positions. The second guide rail 48 is connected to the second mounting tube 36 by a second mounting bracket 50 extending therebetween. The second mounting bracket 50 is connected to the second mounting tube 36 at a collar (not shown) positioned around the second mounting tube 36. The second mounting bracket 50 is connected to the second guide rail 48 by a barlock 45. Rotation of the second mounting bracket 50 causes the connected second guide rail 48 to move in a generally arcuate path to adjust the guide rail.

Because the second lever 80 is connected to the first lever 66, the first and second mounting tubes 34 and 36 are interconnected so that one rotates dependent on the rotation of the other. As a result, the first and second guide rails 40 and 48 connected thereto move together. Thus, the positioning and rotation of the mounting tubes 34 and 36 can be coordinated so that the guide rails 40 and 48 cooperate to align a package 18. Movement of the first lever 66 to the first preselected position shown in FIG. 2 adjusts each of the mounting tubes 34 and 36 so that the guide rails 40 and 48 correctly align the side surface 22 and the upper surface 20 of a first package 18, respectively. When the conveyor system is changed over for use with a second package 18', movement of the first lever 66 to a second preselected position, where the aperture 79 is aligned with the aperture 76', adjusts each of the mounting tubes 34 and 36 so that the guide rails 40 and 48 correctly align the side surface 22' and upper surface 20' of the second package 18'.

Thus, the quickset type of guide system shown in FIGS. 1 and 2 is easily and rapidly adjusted to accommodate a different size of package by moving a single actuator such as lever 66. Moreover, because the mounting tubes 34 and 36 and adjustable guide rails 40 and 48 preferably extend substantially the entire length of the conveyor system 10, the entire conveyor system is changed over by a single operation. There is no need to individually adjust a plurality of mounting brackets like in the conventional guide system. The mounting tubes 34 and 36 can rotate the same or differently, and can be positioned at different locations, depending on the particular shape and size of the packages 18 being conveyed. A competent engineer can custom design the guide system for each line of packages. While the preferred embodiment of the guide system is adjusted by use of a handle mounted on a lever, it could also be adjusted by hand by rotating one of the mounting tubes 34 or 36 or by moving one of the guide rails 40 or 48.

Figure 3:
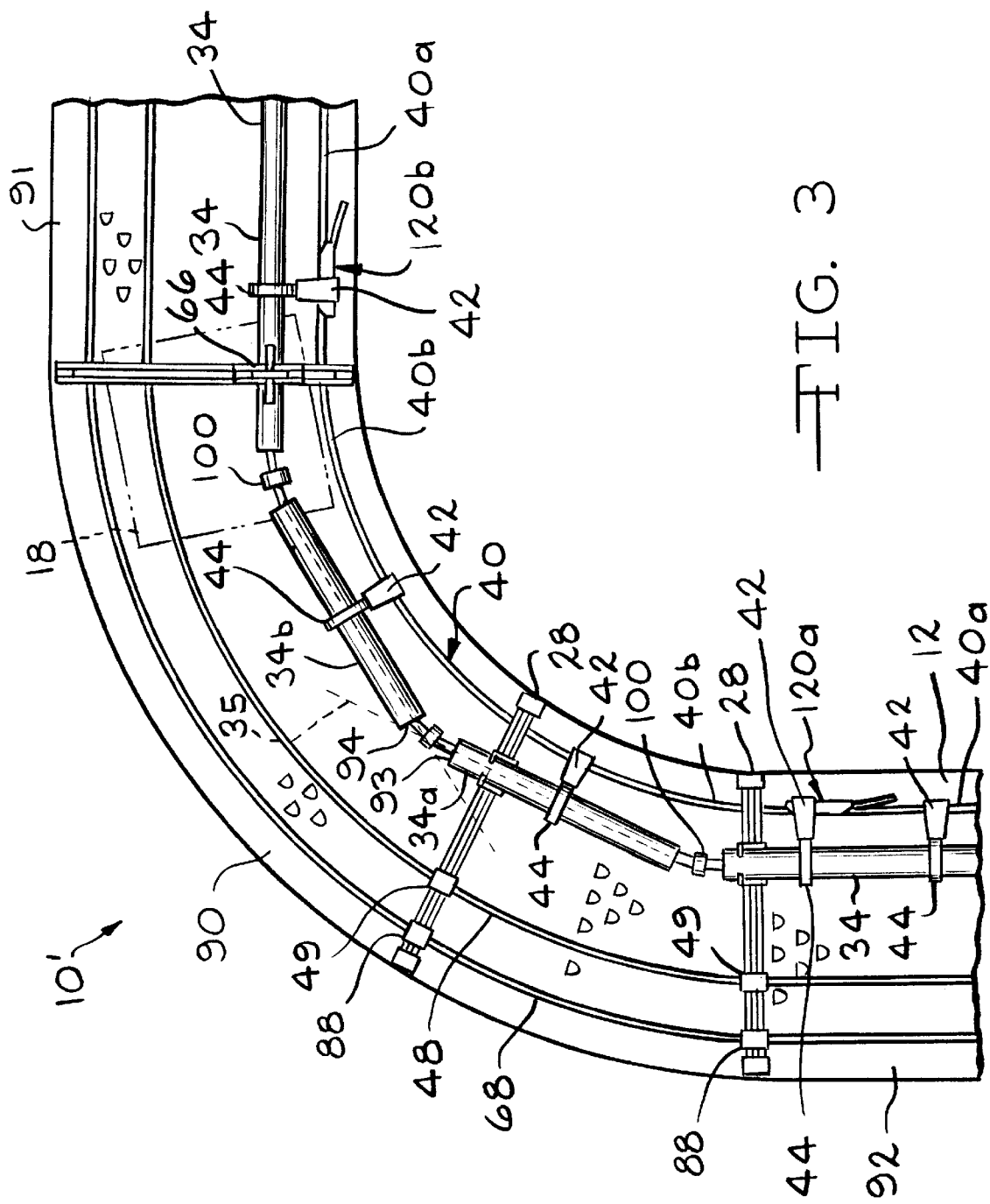
FIG. 3 is a top view of a conveyor system having curved sections and an adjustable guide system in accordance with this invention.

The conveyor system 10 described above is adapted for use with one or more generally straight sections. However, it is often necessary that the conveyor system 10 be configured to include one or more curved sections located between the straight sections. An example of a conveyor system 10' which includes a curved section 90 is shown in FIG. 3. As shown therein, curved section 90 of the conveyor 12 connects a first straight section 91 to a second straight section 92. The straight sections 91 and 92 may include the same type of guide system as described above. However, the guide system for use in the curved section 90 is modified in accordance with this invention as described below.

For clarity, a simplified guide system having only one adjustable guide rail 40 is shown in FIG. 3. Guide rail 40 is adjustable in both the straight sections 91 and 92 and in the curved section 90 so as to accommodate different sizes of packages. The guide rail 40 is adjusted through the use of a plurality of rotatable mounting tubes 34. The other two guide rails 68 and 48 shown in FIG. 3 are illustrated as being fixed guide rails. Similarly to guide system shown in FIGS. 1 and 2, the location of guide rail 68 with respect to the conveyor 12 may be fixed through the use of brackets 88. The location of guide rail 48 may be fixed through the use of brackets 49. Brackets 49 may be also be secured to the cross members 28. As shown in FIG. 3, the two sides of a package 18 will abut guide rails 68 and 40 while the top of each package 18 will abut guide rail 48. Alternatively, guide rail 48 may be configured as an adjustable rail as was shown in FIGS. 1 and 2.

In the curved section 90 of the conveyor system 10' shown in FIG. 3, the adjustable guide rail 40 has a shape which corresponds generally to the shape of the conveyor system 10'. In the straight sections 91 and 92, the guide rail 40 is generally straight. In both the curved section 90 and the straight sections 91 and 92, the guide rail 40 is operatively connected to a plurality of rotatable control members (i.e. the mounting tubes 34.) Each mounting tube 34 may be connected to the guide rail 40 through at least one mounting bracket or arm 42 which extends therebetween. A first end of each mounting bracket 42 may be secured to a mounting tube 34 with a collar 44. The second opposite end of the mounting bracket may be secured to the guide rail 40 with a barlock 45 as shown in FIG. 2, or with a backbar assembly, as will be discussed later.

All of the mounting tubes 34 are generally linear, tubular members and are rotatable about a longitudinal axis 35 (as shown in FIGS. 1 and 3.) Each mounting tube 34 is supported at two separate locations. For example, a mounting tube 34 may be supported by two cross members 28 on opposite ends of the mounting tube 34. Alternatively, a mounting tube 34 may be supported toy one cross member 28 and one coupling device 100 (discussed in detail below) connected to a fully supported adjacent mounting tube 34 or by two coupling devices 100 connected to two fully supported adjacent mounting tubes 34. The mounting tubes 34 in the straight sections 91 and 92 extend spaced apart in an end-to-end fashion and are co-linear. If more than one mounting tube 34 is used in the straight sections 91 and 92, they may be connected together by a connector 38, as shown in FIG. 1. In the curved section 90, the mounting tubes 34 are spaced apart in an end-to-end fashion but they are not co-linear. More specifically, the mounting tube 34a in the curved section 90 extends in a direction which is at an angle α relative to the mounting tube 34b used in the curved section 90. In addition, the mounting tube 34a extends at an angle α relative to the mounting tube 34 used in the second straight section 92. Similarly, the mounting tube 34b extends at an angle α relative to mounting tube 34 used in the first straight section 91. Depending on the curvature of the curved section 90 and the number of mounting tubes 34a, 34b, etc. used in this section 90, the angle α between the various mounting tubes 34 may be the same or different.

Figure 4:
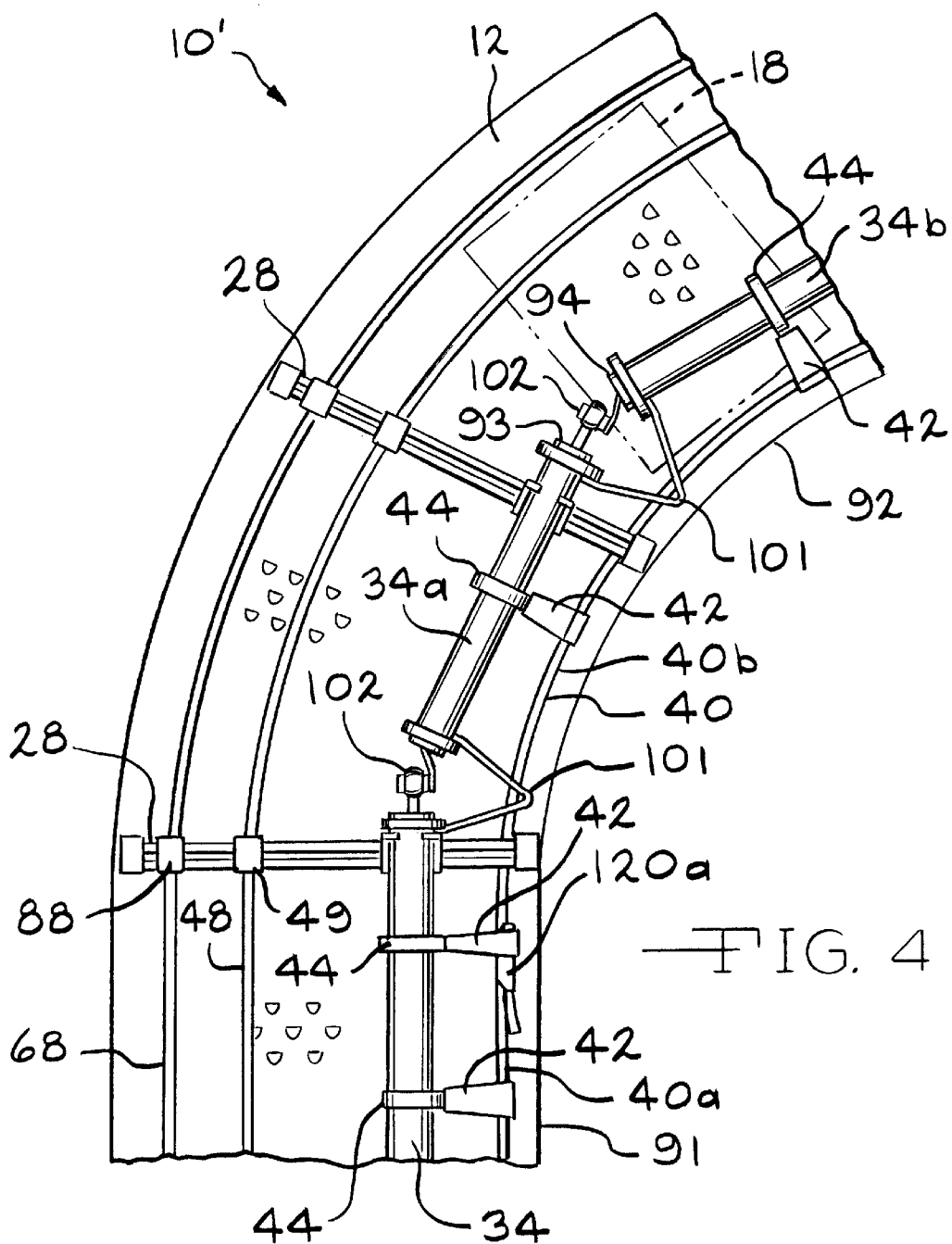
FIG. 4 is a top view of a portion of the conveyor system shown in FIG. 3 which uses a first embodiment of a coupling device in accordance with this invention.
Figure 5:
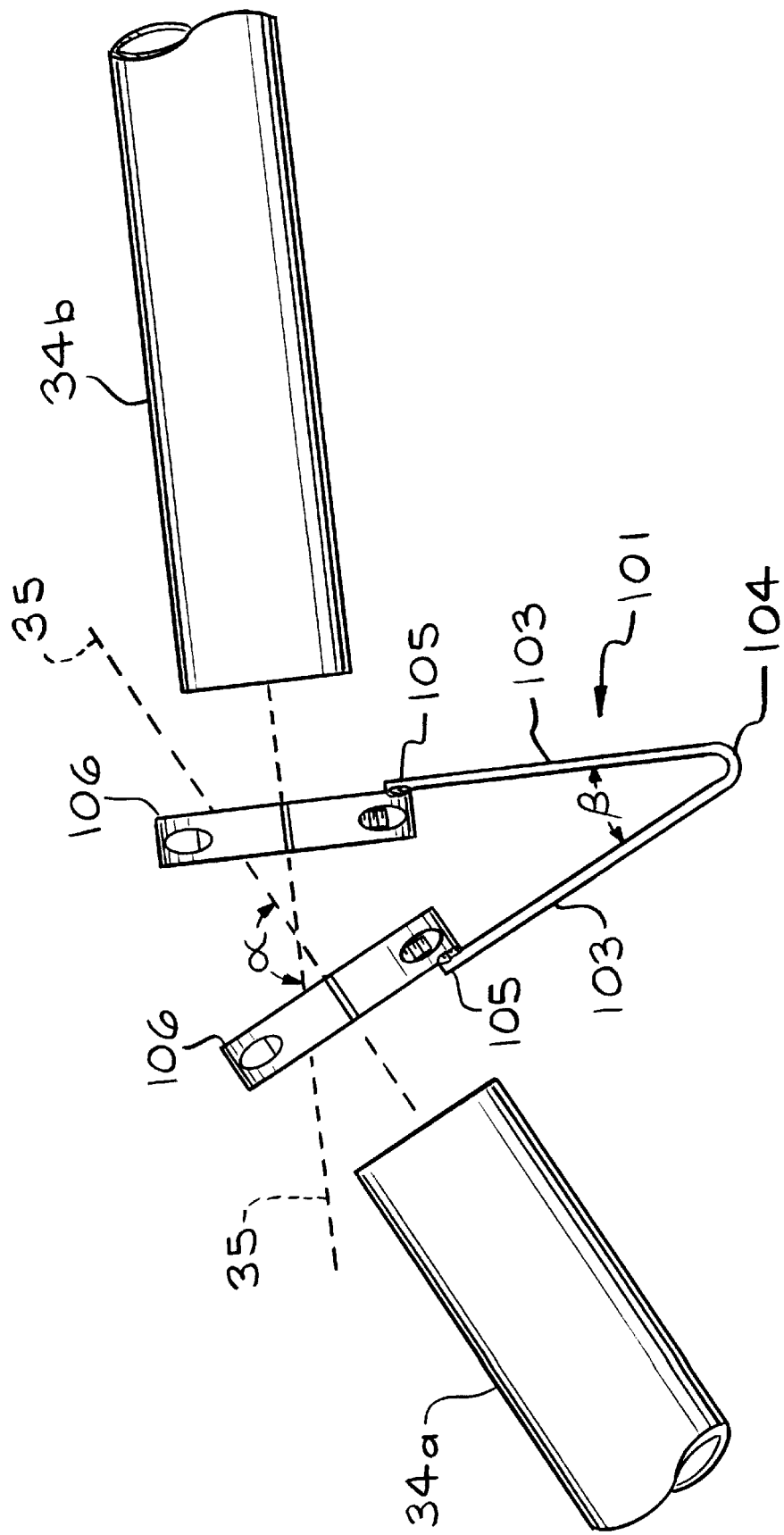
FIG. 5 is an exploded top view of a first member which is a part of the coupling device shown in FIG. 4.

The adjacent ends 93 and 94 of the mounting tubes 34 which are not co-linear with respect to each other are connected by a coupling device, indicated schematically at 100 in FIG. 3. A first embodiment of a coupling device 100 in accordance with this invention is shown in FIGS. 4 through 6. In this first embodiment, the coupling device 100 may be a partial revolution universal joint which transfers the rotation of a single mounting tube, e.g. mounting tube 34 in section 92, in succession to the other mounting tubes which includes mounting tubes 34a and 34b in the curved section 90, mounting tube 34 in section 91, and any number of mounting tubes 34 used in the straight or curved sections. In a second, alternative embodiment, the coupling device 100 may be any known style universal joint.

Referring to FIG. 4, the partial revolution universal joint 100 shown therein includes a first member, indicated generally at 101, and a second member, indicated generally at 102. In the illustrated embodiment, the first member 101 is a flexible arm assembly which is secured to the ends of two adjacent mounting tubes 34 and is used to operatively transfer rotational force between any two adjacent mounting tubes 34. The first member 101 is configured to have directionally sensitive flexibility. Therefore, the first member 101 accommodates moderate changes in relative angle between any two opposing points fixed on the outer surface of any two adjacent and connected mounting tubes 34 as they are rotated, while maintaining a higher degree of rigidity in the direction of rotation. The second member 102 is shown as a tie rod assembly which maintains the point of intersection of the center lines of mounting tubes 34 and maintains the spacing between the adjacent ends 93 and 94 of two mounting tubes 34. Thus, the second member 102 shares in transferring rotational force, thereby causing common rotation between two connected mounting tubes 34 by providing a common reaction point at the intersection of the center lines of adjacent mounting tubes.

A detailed view of the flexible arm assembly 101 is shown in FIG. 5. As shown therein, the flexible arm assembly 101 includes a pair of spaced apart arms 103. The pair of arms 103 is connected together at one end 104 and has a pair of free ends 105 at the opposite end. As such, the pair of arms 103 are spaced apart at an angle β relative to one another. The flexible arm assembly also includes a pair of collars 106. One of the collars 106 is attached to one of the free ends 105 of the pair of arms 103 while the other collar 106 is attached to the other free end 105 of the pair of arms 103. Each collar 106 may be a two piece clamp collar which is adapted to be mounted externally on a mounting tube 34. Each collar 106 is secured to a mounting tube 34 such that it will rotate with that mounting tube.

The pair of flexible arms 103 may be formed from a generally flat piece of metal. This flat piece of metal may be bent at an angle β to form the pair of spaced apart arms 103 connected at the end 104. The angle β may be configured to be the complementary angle to the angle α. In the illustrated embodiment, the angle α between the two mounting tubes 34a and 34b is about 150° while the angle β between the pair of spaced apart arms 103 is about 30°. In a preferred embodiment, the free ends of the flexible arm 105 are welded to the outboard side of each of the clamp collars 106 (as best seen in FIG. 5.) The free ends 105 of the arms 103 may be flared to assist in the welding of each arm 103 to each clamp collar 106. A single weld may be made on the outboard side of each clamp collar 106. Alternatively, two welds on both the inboard and outboard sides of each of the free ends 105 of the pair of arms 103 may be used. Other methods of attachment such as riveting or threaded fasteners are also suitable. Preferably, the arms 103 and collars 106 are made from stainless steel, especially when the conveyor system 10' is to be used for food handling. If the conveyor system 10' will not be used for food handling, the arms 103 may be made from any suitable material such as spring steel, other high tensile strength steel, plastics or composites. The flexible arm assembly 101 may be connected to the mounting tube 34a and 34b by mounting the clamp collars 106 around the outer surface of members 34a and 34b and then tightening the clamp collars 106 in place.

A detailed view of the tie rod assembly 102 is shown in FIG. 6. In the illustrated embodiment, the tie rod assembly 102 includes a first tie rod end adapter 107 and a second tie rod end adapter 108, interconnected by a fastener 109. The first tie rod end adapter 107 includes a generally cylindrical insert 110 which is disposed within the end 93 of the mounting tube 34a. Similarly, the second tie rod end adapter 108 includes a generally cylindrical insert 110 which is disposed within the end 94 of the mounting tube 34b. Both inserts 110 may be sized so as to slip inside an end 93 or 94 and then be clamped tight when the mounting tubes 34 are clamped by collars 106. Alternatively, the inserts 110 may be press fit within an end 93 or 94 so as to secure the first tie rod end adapter 107 to the mounting tube 34a and to secure the second tie rod end adapter 108 to the mounting tube 34b, respectively. Alternatively, the inserts 110 and ends 93 and 94 may have mating threads. In yet another embodiment, the inserts 110 may be welded to ends 93 or 94 for securing the first tie rod end adapter 107 and the second 108 tie rod end adapter to their respective mounting tube 34a or 34b.

The first tie rod end adapter 107 includes an eyebolt 111. The eyebolt 111 may be received within a threaded aperture provided in insert 110. The eyebolt 111 includes an eye portion 112 having a spherical bushing 113 positioned therein. The bushing 113 has an aperture 114 formed therethrough. When the tie rod assembly 102 is assembled, a faster 109 may be inserted through the aperture 114 of the spherical bushing 113. The spherical bushing 113 allows the fastener 109 to rotate within the eye portion 112 of the eyebolt 111 as needed in any direction. In a preferred embodiment, the eyebolt 111 is provided with a Teflon liner (not shown) allowing the fastener 109 and spherical bushing 113 to smoothly rotate as needed about any axis about the center of the spherical bushing. Other materials which may be suitable for the bushing 113 include plastic, synthetic materials, or other metals.

In the illustrated embodiment, the second tie rod end adapter 108 is provided with an extension 115. The extension 115 is secured to the insert 110 on one end and includes an aperture 116 on the opposite end. The aperture 116 is used for attaching the second tie rod end adapter 108 to the fastener 109. The extension 115 may be a flat piece of stainless steel, slightly less wide than the diameter of the insert 110. The extension 115 may be welded or otherwise secured to the insert 110 of the second tie rod end adapter 108 such that the extension 115 extends from the second tie rod end adapter at an angle. The extension 115 may be offset from the center line of the second tie rod end adapter 108 an amount which is sufficient to allow the insertion of a spacer 117 between the eyebolt 111 and the extension 115 when the tie rod assembly 102 is assembled.

The tie rod assembly 102 is assembled as follows: The insert 110 of the first rod tie end adapter 107 is inserted into the end 93 of the mounting tube 34a. Similarly, the insert 110 of the second tie rod end adapter 108 is inserted into the end 94 of the mounting tube 34b. Both the first tie rod end adapter 107 and the second tie rod end adapter 108 are inserted sufficiently into their respective mounting tube 34a or 34b such that the aperture 114 of the spherical bushing 113 in the eye portion 112 of the first tie rod end adapter 107 is generally aligned with the aperture 116 in the extension 115 of the second tie rod end adapter 108. Once the apertures 114 and 116 are aligned, a spacer 117 having an aperture 118 is positioned between the eye portion 112 and the extension 115. Generally, the aperture 118 will be the same size as apertures 114 and 116. A threaded fastener 109 is then inserted through apertures 114, 118 and 116 and tightened using a threaded nut 119.

The partial revolution universal joint 100 forces connected mounting tubes 34 to rotate together. In most guide systems, the adjustable control members (i.e. mounting tubes 34) are only rotated through a limited range of motion. For example, these adjustable members 34 are usually rotated about 60° or less. Therefore, neither the mounting tubes 34 nor the partial revolution universal joint 100 are rotated through a full 360°. Instead, the mounting tubes 34 and the partial revolution universal joint 100 are rotated through only a partial revolution which is sufficient to reposition the attached guide rails 40 and thus, accommodate different sizes of packages. A pair of adjacent mounting tubes 34 may be positioned at various angles α relative to each other. The angle β between the spaced apart arms 103 of the flexible arm 101 may be configured to be the complementary angle to the angle α.

In a second embodiment of this invention, the coupling device 100, as shown schematically in FIG. 3, may be any known style universal joint. Similarly to the first embodiment of this invention, the universal joint 100 is used to connect two adjacent linear mounting tubes 34 located above the curved section 90 of the conveyor system 12. The general structure of universal joints is well known in the art, and only those portions of this structure which are necessary to understand this invention will be discussed herein. In general, a universal joint 100 includes a cross member disposed within a pair of yokes. The cross member includes a central body portion having four cylindrical trunnions extending outwardly from the central body. Each trunnion is positioned within one of four openings formed in the two arms of each of the two yokes through the use of a bearing. A lubricant is usually provided to each bearing so that the trunnion may rotate freely within the yoke. Typically, the lubricant is provided to each bearing through a internal passageway in each trunnion. The lubricant flows through the internal passageway and around the end of the trunnion to each bearing. Some leakage of the lubricant may occur. Because of the potential of lubricant leakage from the bearing, the universal joint 100 may require modification or an additional mechanism for containing this leakage, especially when the conveyor system is used for handling food packages.

In the illustrated embodiment shown in FIG. 3, the adjustable guide rail 40 is shown as being comprised as three separate sections, 40*a*, 40*b*, and 40*c*. In accordance with this invention, the guide system may include one or more guide rail slip joint brackets, indicated generally at 120 in FIGS. 3, 4 and 7 through 9, for connecting a curved section and a straight section of the guide rail 40 together. In the illustrated embodiment, a first guide rail slip joint bracket 120*a* is used to connect a first section 40*a* of the guide rail 40 to a second section 40*b*. Similarly, a second guide rail slip joint bracket 120*b* is used to connect the second section 40*b* to a third section 40*c*. The number of guide rail slip joints 120 used may vary depending on the configuration of the conveyor system 10'.

As the guide rail 40 is adjusted inward and outward along the curved section 90 of the conveyor surface 12, the overall length of the active portion of guide rail 40 changes in accordance with the change in radius of the curved portion of the guide path. Thus, the overall length of the guide rail 40 when adjusted for a larger package 18 is shorter than the overall length of the guide rail 40 when adjusted for a smaller package 18.

A detailed view of a guide rail slip joint bracket 120 is shown in FIGS. 7 through 9. In the illustrated embodiment, the slip joint bracket 120 is a generally rectangular-shaped member comprised of a top plate 122 which is spaced apart from a bottom plate 124. A generally rectangular slot or aperture 126 is formed in each plate 122 and 124 (only the aperture 126 formed in the top plate 122 is visible in FIG. 7). As shown in FIG. 7, the apertures 126 are formed adjacent to one end 127 of the slip joint bracket 120. The apertures 126 in each plate 122 and 124 are aligned for receiving a bolt 128 or other fastener therebetween. The bolt 128 is positioned within the apertures 126 such that the head of the bolt is received in the apertures 126 and is welded or otherwise secured to the two plates 122 and 124. The bolt 128 is used for attaching the slide joint bracket 120 to a mounting bracket 42 as shown in FIG. 7.

A first straight section 40*a* of the guide rail 40 is positioned in a first corner 130 of the opposite end 131 of the slip joint bracket 120. As shown in FIG. 8, a portion of section 40*a* extends in between the top plate 122 and the bottom plate 124. This straight portion of section 40*a* may be welded, bolted, clamped or otherwise secured between both plates 122 and 124. A second curved section 40*b* of the guide rail 40 is inserted through the opposite, second end 127 of the slip joint bracket 120. This curved second section 40*b* is inserted through a first corner 132 of the second end 127 and extends through and beyond a second corner 134 of the first end 131 of the slip joint bracket 120. The second section 40*b* is free to slide in between the top plate 122 and the bottom plate 124. The first corner 130 of the first end 131 and the first corner 132 of the second end 127 may be angled as shown in FIG. 7. Preferably, the fastener 128 is positioned adjacent a second corner 136 of the second end 127.

As shown in FIGS. 7 through 9, the distance between the top plate 122 and the bottom plate 124 varies throughout the slip joint bracket 120. The greatest distance occurs in the second corner 134 of the first end 131 of the slip joint bracket 120 where the free end of the second guide rail curved section 40*b* emerges. This corner 134 is tapered outward to allow the slip joint bracket 120 and guide rail 40*a* to rotate with control member 34 without interference with the extended portion of the second guide rail curved section 40*b* which does not rotate as it slides through the slip joint bracket 120. When the guide rail 40 is repositioned such that its length must be shortened, section 40*b* will slide through the slip joint bracket 120 such that a longer portion of 40*b* extends beyond the slip joint bracket 120. Similarly, when the guide rail 40 must be lengthened, section 40*b* will slide in the opposite direction such that the portion extending beyond the slip joint bracket 120 becomes shorter.

Figure 10:
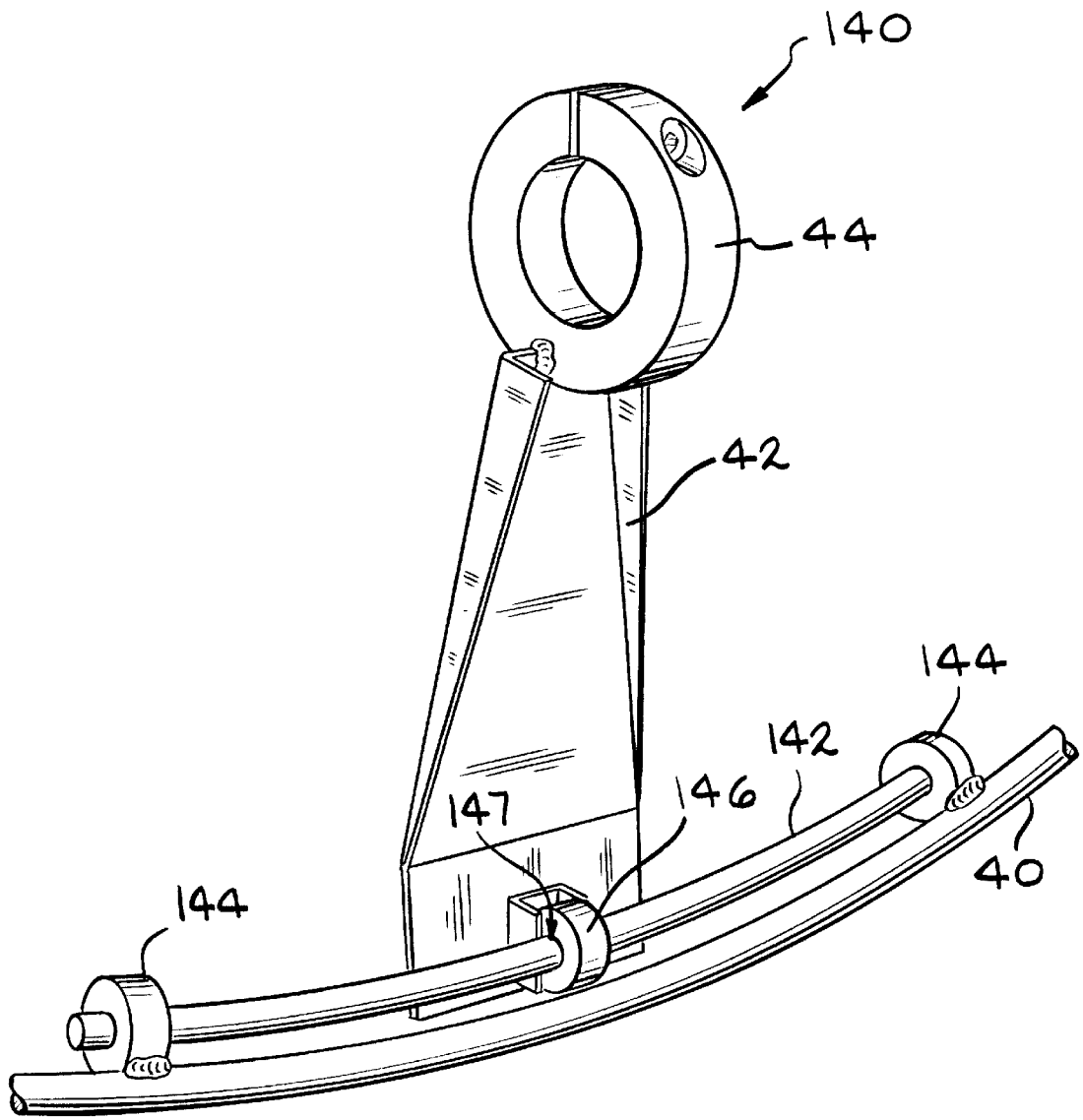
FIG. 10 is a front view of a backbar assembly in accordance with this invention as used in a curved section of a conveyor system.
Figure 11:
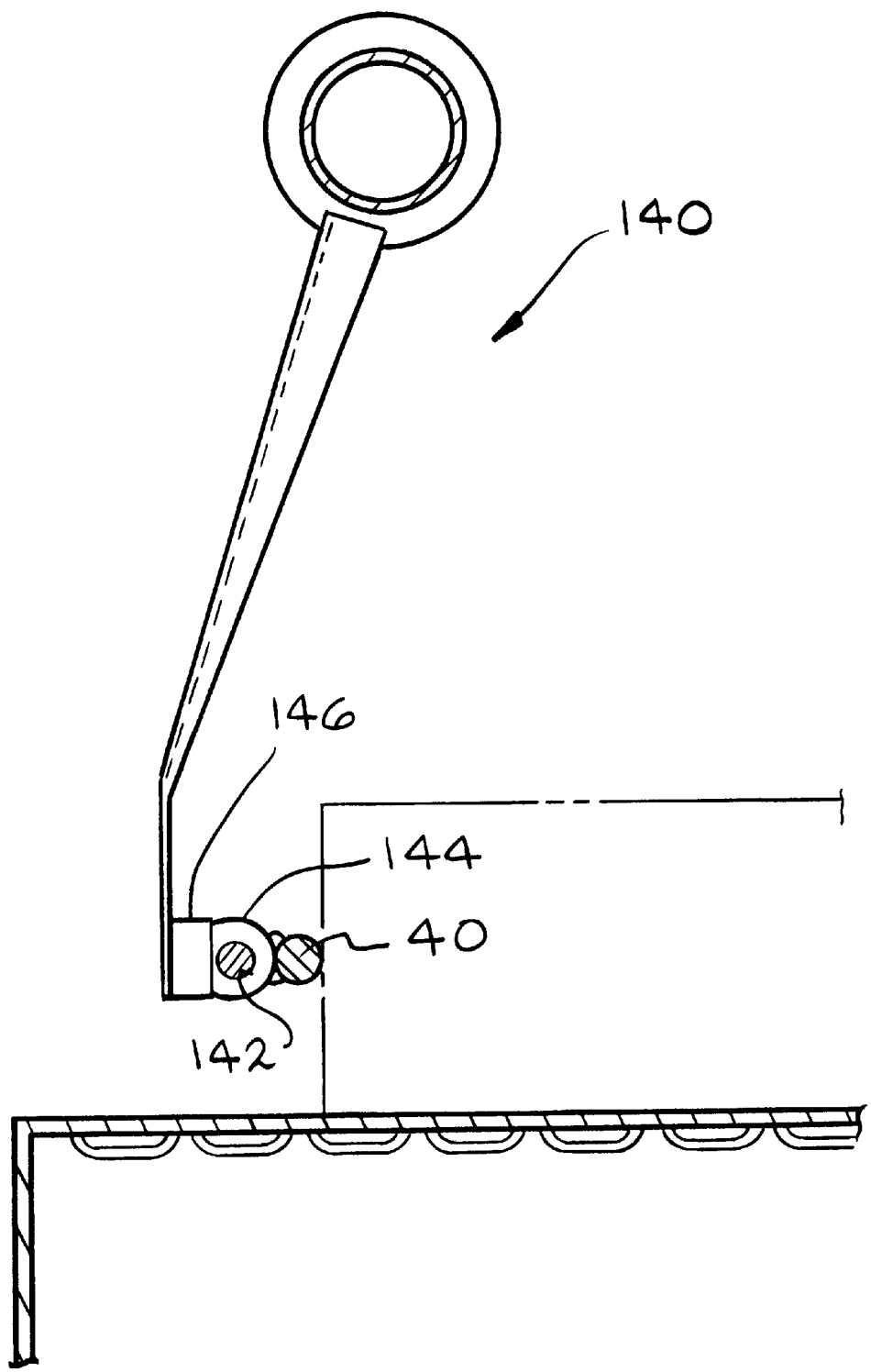
FIG. 11 is a side view of the backbar assembly shown in FIG. 10.
Figure 12:
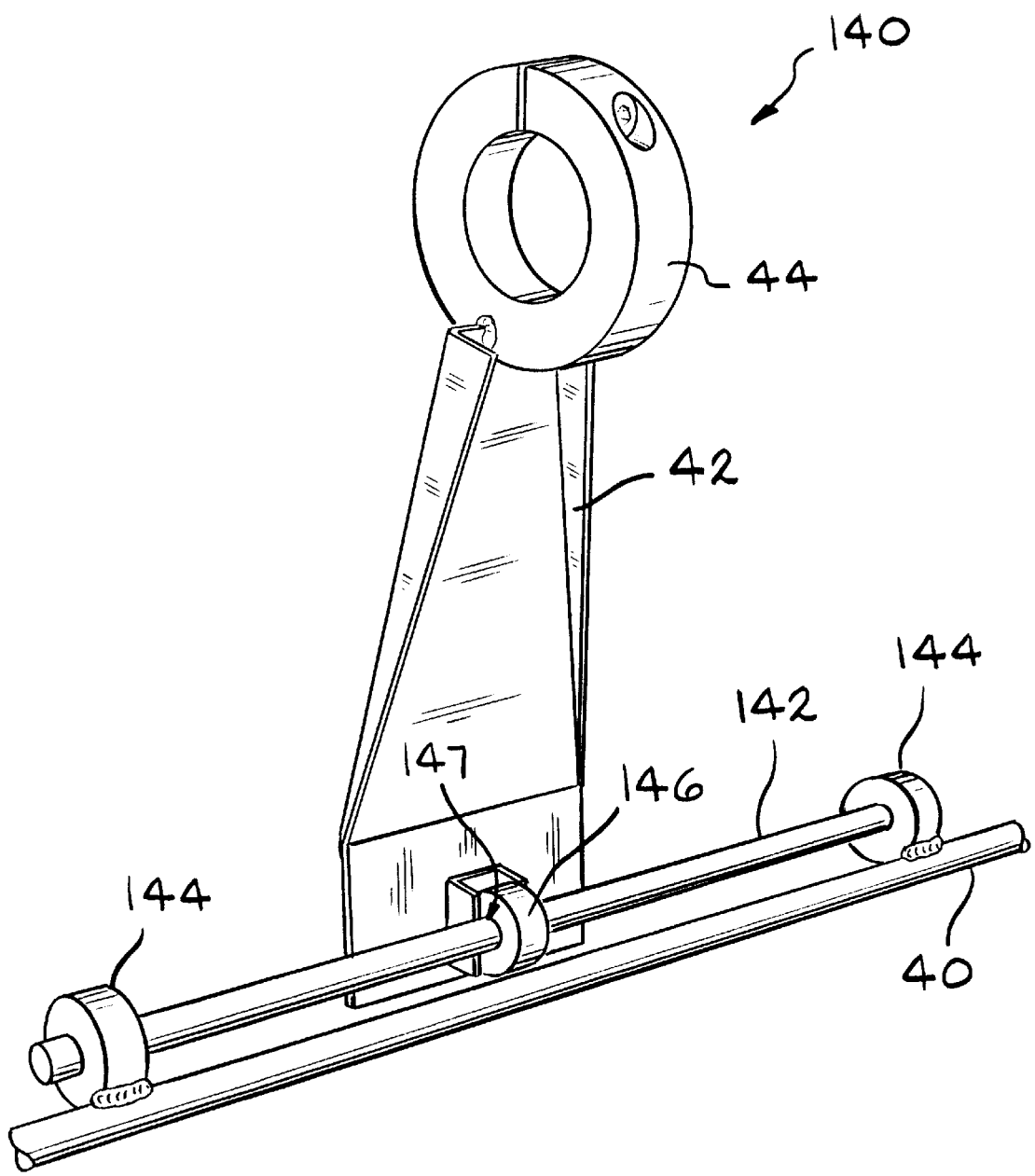
FIG. 12 is a front view of a backbar assembly in accordance with this invention as used on a straight section of a conveyor system.

The quickset type of guide system may also include a backbar assembly, indicated generally at 140 in FIGS. 10 through 12, for connecting the mounting brackets 42 to the guide rail 40. As shown therein, the backbar assembly 140 includes a guide rail backbar extension 142 and two clamp collars 144 welded to the guide trail 40. The backbar extension 142 is a relatively short, cylindrical member. Preferably, the backbar extension 142 is configured to have the same shape as the section of the guide rail 40 to which it is adjacent. Therefore, if the backbar assembly 140 is used with a curved guide rail 40, the backbar extension 142 should be configured to have the radius of the curved guide rail 40, as shown in FIG. 10. If the backbar assembly 140 is used with a straight guide rail 40, the backbar extension 142 should be similarly straight, as shown in FIG. 12. The backbar extension 142 is positioned adjacent the guide rail 40. Preferably, the backbar extension 142 is located outside the guide path of the packages 18. Any method of securing the backbar extension 142 to the guide rail 40 may be used. The illustrated embodiment shown in FIG. 10 uses set collars 144 welded to the guide rail 40 to attach the backbar extension 142 to the guide rail 40. Thus, the backbar extension 142 is secured to the guide rail 40 at two points, thereby providing a secure connection. Because the backbar extension 142 is not in the guide path of the packages 18, the mounting bracket 42 can be attached to the backbar extension 142 using a connector which fully encircles the backbar 142. For example, the mounting bracket 42 may include a tab 146 having an aperture 147 formed therein which captures the backbar extension 142 for movement therewith. The aperture 147 is sized as a slip fit to the backbar 142 to allow freedom of motion in the axial direction of 142. This allows the guide rail 40 to move tangentially.

In operation, the coupling device 100, the backbar assembly 140, and guide rail slip joint bracket 120 in accordance with this invention are used to adjust the guide system. The adjustable guide rail 40 is repositioned by operating the single lever 66 as shown in FIG. 3 (provided the overall length of the conveyor system 10' is not too long, in which case, two or more levers 66 may be used to adjust the guide system.) In the illustrated embodiment, the lever 66 is used to rotate the mounting tube 34 used in the first straight section 91. The rotation of the mounting tube 34 in the first straight section 91 in turn causes the mounting tubes 34*a* and 34*b* in the curved section 90 and the mounting tube 34 in the second straight section 92 to also rotate. All of the mounting tubes 34 rotate together because each coupling device 100 operatively connects each of the mounting tubes 34 to its adjacent mounting tube 34. The lever 66 is actuated to change the distance between the adjustable guide rail 40 and the fixed guide rail 68. As such, the guide rail system in accordance with this invention can be adjusted to move packages 18 of different sizes.

When the adjustable guide rail 40 is repositioned, the mounting tubes rotate and the flexible arm assembly 101 of the coupling device 100 must flex as the bases of the arms 103 rotate in separate planes each perpendicular to the mounting tubes 34*a* and 34*b*. In other terms, as the arms rotate with the tubes the arm bases rotate about the center lines of the angled tubes. The connected ends of the arms would normally rotate in planes about their respective tube center lines but these planes divert from each other. Thus, the ends of the arms which are connected at the bend must flex from their normal plane to a plane midway between the two planes perpendicular to 34*a* and 34*b*.

In addition, when the adjustable guide rail 40 is repositioned, the required length of the guide rail 40 becomes longer or shorter depending on the radius of the guide path. In order to accommodate this change in length, one section of the guide rail 40*b* slides through the slip joint bracket 120 at the tangent point between the curved portion and the adjacent straight portion, thereby increasing or decreasing the overall active length of the guide rail 40 while maintaining a continuous and relatively uniform guide surface.

While the coupling device 100, the backbar assembly 140, and the guide rail slip joint bracket 120 have been described above with reference to the specific quickset type of guide system, these inventions may be used with other adjustable guide systems. In addition, the specific adjustable guide system as described above may be modified and still be adapted for use with the inventive coupling device 100 and guide rail slip joint bracket 120. For example, the adjustable guide system has been illustrated using a single adjustable guide rail 40. Alternatively, two adjustable guide rails 40 and 48 could be employed. In this latter configuration, a coupling device 100 would be used to connect the various mounting tubes associated with each guide rail and the change in length of the adjustable guide rail 48 could be accommodated by using at least one guide rail slip joint of a coaxial design for the top guide rail 48. Furthermore, other shapes and sizes of mounting tubes and guide rails can also be used.

Although the preferred mounting tubes and guide rails are formed from a metallic material such as stainless steel, they can also be formed from other materials such as plastics or composites. In a preferred embodiment, each mounting tube has a diameter between about 1½ inches (3.81 cm) and about 1¾ inches (4.45 cm), and each guide rail has a diameter of about ⅜ inch (0.95 cm). However, other diameters may be suitable, depending on a number of factors including choice of materials and the lengths of the mounting tubes and guide rails. The mounting tubes can also be solid instead of hollow, and the guide rails can be hollow instead of solid.

A guide system using the coupling device 100, guide rail slip joint bracket 120, and backbar assembly 140 of this invention can be used for aligning any of a wide variety of different kinds of packages. For example, the packages can be cereal boxes, baked goods boxes, other boxes of packaged goods. The guide system can be used with bottles or other packages in addition to boxes. The adjustment levers 66 used to reposition the guide system can be operated through the use of air, electrical or hydraulic powered actuators. These can be part of an automatic control system which does not require any human intervention. However, the guide system is also very quick and easy to adjust by hand.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A guide system for packages on a curved section of a conveyor system, said guide system comprising:

an adjustable guide member for aligning the packages as they move along the conveyor system, said adjustable guide member having a curved shape which corresponds to the curved section of the conveyor system;

generally linear, first and second control members connected to said adjustable guide member, said first control member being positioned end to end and at an angle $\alpha$ relative to said second control member; and a coupling device connecting said first control member to said second control member, said coupling device transferring a rotational torque from said first control member to said second control member when said first control member is rotated around its longitudinal axis, said rotation of said first and second control members causing said adjustable guide member to move in a generally arcuate path so as to accommodate different sizes of packages on the conveyor system, said coupling device including a first member and a second member, said first member including a pair of spaced apart arms connected together at one end and having a pair of free ends at an opposite end, said pair of arms being spaced apart at an angle $\beta$ relative to one another, one of said free ends of said pair of arms being secured to an outer surface of said first control member for rotation therewith, the other of said free ends of said pair of arms being secured to an outer surface of said second control member for rotation therewith, said first member flexing to accommodate the change in distance between any two opposing points fixed on said first control member and said second control member as said first and second control members are rotated, said second member also being secured to adjacent ends of said first control member and said second control member such that said second control member maintains the spacing between said first control member and said second control member as said first and second control members are rotated.

2. The guide system defined in claim 1 wherein said second member is a tie rod assembly, said tie rod assembly including a first tie rod end adapter connected to said first control member and a second tie rod end adapter connected to said second control member, said first tie rod end adapter having an eyebolt extending therefrom in a generally parallel direction, said eyebolt having an aperture formed therein in an eye portion of said eyebolt, said second tie rod adapter having an extension extending therefrom at an angle φ relative to said second tie rod adapter, said extension having an aperture formed therein, and said first tie rod end adapter being secured to said second tie rod end adapter with a fastener positioned in said eye portion aperture and said extension aperture, both of which have been aligned with one another.

3. The guide system defined in claim 2 wherein said eyebolt further includes a spherical bushing positioned in said eye portion aperture, said bushing providing the needed rotational freedom of movement in any direction about the center of said spherical bushing of said fastener positioned in said eye portion aperture.

4. The guide system defined in claim 2 wherein said first tie rod end adapter includes a first insert disposed within said first control member and secured thereto and said second tie rod end adapter includes a second insert disposed within said second control member and secured thereto.

5. The guide system defined in claim 1 wherein said adjustable guide member includes a first and second section and said guide system further includes a guide member slip joint which connects said first guide member section to said second guide member section and allows an overall length of said first and second guide member sections to change as said guide member is adjusted to accommodate packages of different size.

6. The guide system defined in claim 5 wherein said guide member slip joint includes a pair of spaced-apart plates, said pair of plates being secured together by a fastener which extends therebetween, said first section of said guide member extending into a first corner of a first end of said slip joint between said pair of plates, said first guide member section being secured to said pair of plates, said second section of said guide member extending into a first corner of a second, opposite end of said slip joint between said pair of plates such that a portion of said second guide member section extends beyond a second corner of said first end of said slip joint, said second guide member section being free to slide between said pair of plates and extend beyond said second corner of said first end of said slip joint as necessary so as to vary said overall length of said first and second guide member sections.

7. The guide system defined in claim 6 wherein the distance between said pair of spaced-apart plates is greater at said second corner of said first end of said slip joint than the distance between said pair of plates in the first corner of said first end of said slip joint.

8. The guide system defined in claim 1 wherein said first control member is connected to said adjustable guide member by a first arm extending therebetween and said second control member is connected to said adjustable guide member by a second arm extending therebetween.

9. The guide system defined in claim 1 further including a third, generally linear, control member and a second, generally linear, guide member both positioned above a generally straight section of the conveyor system, said guide system further including a guide member slip joint for connecting said adjustable first guide member to said second guide member, said coupling device connecting said third control member to said second control member such that said second control member and said third control member are rotated about their longitudinal axis when said first control member is rotated around its longitudinal axis and said first and second guide members are moved in an arcuate path so as to accommodate packages having a different size when said first, second, and third control members are rotated.

10. A coupling device for use in a guide system for packages on a curved conveyor system, the guide system including an adjustable guide member for aligning the packages as they move along the conveyor system and generally linear, first and second control members connected to said adjustable guide member, said adjustable guide member having a curved shape which corresponds to the curved section of the conveyor system, and said first control member being spaced apart in an end to end fashion with said second control member and extending at an angle α relative to said second control member, said coupling device including:

a first, flexible member secured to adjacent ends of said first and second control members for transferring rotational motion therebetween and a second member secured between adjacent ends of said first and second control members for maintaining a predetermined point of intersection of the center lines of said first and second control members.

11. The coupling device defined in claim 10 wherein said first member includes a pair of spaced apart arms connected together at one end and having a pair of free ends at an opposite end, said pair of arms being spaced apart at an angle β relative to one another, one of said free ends of said pair of arms being secured to said outer surface of said first control member for rotation therewith, the other of said free ends of said pair of arms being secured to said outer surface of said second control member for rotation therewith, said first member being flexible to accommodate the change in distance between any two opposing points fixed on said first control member and said second control member as said first and second control members are rotated.

12. The coupling device defined in claim 10 wherein said second member is a tie rod assembly, said tie rod assembly including a first tie rod end adapter having a cylindrical insert which is press fit within said first control member and a second tie rod end adapter having a cylindrical insert which is press fit within said second control member, said first tie rod end adapter having an eyebolt extending therefrom in a generally parallel direction, said eyebolt having an aperture formed therein in an eye portion of said eyebolt, said second tie rod adapter having an extension extending therefrom at an angle φ relative to said second tie rod adapter, said extension having an aperture formed therein, and said first tie rod end adapter being secured to said second tie rod end adapter with a fastener positioned in said eye portion aperture and said extension aperture, both of which have been aligned with one another.

13. The guide system defined in claim 12 wherein said eyebolt further includes a spherical bushing positioned in said eye portion aperture, said bushing providing the needed rotational freedom of movement in any direction about the center of said spherical bushing of said fastener positioned in said eye portion aperture.

14. A guide rail slip joint for use in a guide system for packages on a conveyor system, the guide system including an adjustable guide member for aligning the packages as they move along the conveyor system and generally linear and first and second control members connected to said adjustable guide member, said adjustable guide member including a first and second section, each section having a shape which corresponds to the conveyor system, said first control member being coupled to said second control member such that said second control member is rotated when said first control member is rotated and said adjustable guide member is moved in a generally arcuate path in order to adjust said guide members to accommodate different sizes of packages, said guide rail slip joint comprising:

a top plate;

a bottom plate generally aligned with and spaced apart from said top plate; and means for securing said top plate to said bottom plate, said top plate and said bottom plate being spaced apart such that said first section and said second section of said guide member extend between said plates, said first section of said guide member being secured to one or both of said top and bottom plates, and said second section of said guide member extending through and beyond said top and bottom plates and being free to slide therebetween so as to vary said overall length of said first and second guide member sections.

15. The guide rail slip joint defined in claim 14 wherein said top plate and said bottom plate are generally rectangular and said second section of said guide member extends beyond a first aligned corner of said top plate and said bottom plate.

16. The guide rail slip joint defined in claim 15 wherein a distance between said top plate and said bottom plate at said first corner is greater than a distance between said top and bottom plates in the remaining corners of said slip joint.

* * * * *